Sept. 2, 1924.  1,506,941
G. D. PARKER
DOUBLE BOX MAKING MACHINE
Filed March 27, 1923   5 Sheets-Sheet 2

Sept. 2, 1924.

G. D. PARKER 1,506,941

DOUBLE BOX MAKING MACHINE

Filed March 27, 1923     5 Sheets-Sheet 3

Inventor.
George D. Parker
By Ackers & Totten
Attys.

Sept. 2, 1924.  
G. D. PARKER  
DOUBLE BOX MAKING MACHINE  
Filed March 27, 1923    5 Sheets-Sheet 4

1,506,941

Inventor  
George D. Parker  
By Crerar & Totten  
Attys.

Patented Sept. 2, 1924.

1,506,941

UNITED STATES PATENT OFFICE.

GEORGE D. PARKER, OF RIVERSIDE, CALIFORNIA.

DOUBLE-BOX-MAKING MACHINE.

Application filed March 27, 1923. Serial No. 627,955.

*To all whom it may concern:*

Be it known that I, GEORGE D. PARKER, a citizen of the United States, residing at Riverside, in the county of Riverside and State of California, have invented certain new and useful Improvements in Double-Box-Making Machines, of which the following is a specification.

This invention relates to a semiautomatic machine for holding and nailing box parts in the quantity manufacture of open top boxes of various sorts, sizes and description.

A principal object of the invention resides in providing a semiautomatic machine of a simple construction, highly efficient in operation, and capable of producing a large number of completely assembled boxes of a given size and shape in the minimum of time and with the minimum of labor.

Another object of the invention resides in providing a box nailing and assembling machine that is semiautomatic in operation and is entirely controllable by the operator through the medium of manually operable elements forming a part of the machine.

Another object of the invention resides in providing a box assembling and nailing machine that is adapted to operate on more than one box at a time, thereby materially increasing production with the same expenditure of labor.

A still further object of the invention resides in providing a multiplicity of box assembling forms, all interchangeably related and all adapted to placement and operation in the same machine and without the necessity of any appreciable adjustment of the various machine elements to accommodate the various interchangeable forms.

Still further objects reside in the particular arrangement of the relating operative elements of the machine, referring particularly to a special indexing and positioning mechanism that is designed to automatically control the movement and positioning of the box assembling form when changing from a position of completed operation to a position of commencing operation, during which period the operator is free to bring the box parts next needed, into the operating zone of the nailing and assembling mechanism, so that no time need be lost in waiting for the commencement of the next operation. Thus a skilled operator would be able to manipulate the machine with considerable rapidity and thereby produce a maximum number of completed boxes in a given period of time.

With such objects in view, as well as other advantages which may be incident to the use of the improvements, the invention consists in the procedure, and in the parts and combinations thereof hereinafter set forth and claimed, with the understanding that the several necessary elements constituting the same may be varied in proportion and arrangement without departing from the nature of the invention.

In order to make the invention more clearly understood there are shown in the accompanying drawings means for carrying the same into practical effect, without limiting the improvements in their useful applications, to the particular constructions which, for the purpose of explanation, have been made the subject of illustration.

In connection with the drawings forming a part of this specification I wish to point out that the general arrangement of the related parts, their placement and operative timing have all been so shown and displayed that the operation of the invention would be most clearly understood, the drawings therefore, are to be looked upon as somewhat diagrammatic in their disclosures. Further reference will be made to this feature of the illustrations as the description proceeds.

Reference now being had to the drawings, Fig. 1 is a front elevation of a machine embodying my invention and shows a general arrangement of the various mechanical parts in their operative positions. Some of the nonessential elements of a complete machine being omitted to avoid confusion. For example only the foot pedal of the clutch driving mechanism is shown. I have also omitted entirely the mechanism for handling and delivering individual nails to the nailing chucks as these elements are old and well known and most fully shown and described in my former patents pertaining to this art.

Fig. 2 is a vertical sectional elevation taken on line 2—2 of Fig. 1, looking in direction of the arrows. In this view the same elements have been omitted as in Fig. 1. I have shown in this view a finished box just having been ejected from the machine and the parts for another box ready for placement on the box form as soon as the box now on the form is finished and ejected. The relative positions of the various parts are the same as in Fig. 1, except that the ejector lever is shown as just having ejected a finished box. The dotted circles on this view represent the pitch lines of the teeth of the driving gears which would normally appear on the right side of Fig. 1 but which are cut away in this view.

" Fig. 3 shows the operating elements in the same relative positions as in Figs. 1 and 2. Fig. 4, however, shows the nailing anvils in their lowermost position and the nailing chucks in their uppermost position, the box form having just made a quarter revolution through the controlling action of the indexing mechanism and the driving elements therefor. Fig. 4 is the idle position of the machine. These two views are intended to give a general idea of the indexing mechanism in its general relation to the other operating elements of the machine.

Fig. 5 is an enlarged view of the indexing mechanism with the various parts in the same general positions as in Fig. 3. In this view I have not shown anything beyond the plane of this indexing mechanism, so that it would stand out in clear relief and be easily understood.

Fig. 6 is a vertical sectional elevation taken on line 6—6 of Fig. 5 looking in the direction of the arrows and shows the parts in the same related positions as Fig. 5.

Fig. 7 is a sectional plan taken on line 7—7 of Fig. 5 looking in the direction of the arrows and is intended to clearly show the T head portion of the indexing plunger resting in its normal position of inactivity. The dotted lines forming a rectangular figure lying directly over the head of the plunger represents the location of the indexing member mounted on the box form shaft.

Fig. 8 is a detail plan view of the indexing member riding on the head of the plunger and holding it in a depressed position until it can enter one of the squared notches of the index member, the arrow indicates the direction of rotation of the index member. It will be noted that the vertical displacement of the index member in this view is the same as shown on Fig. 4 only on a larger scale, except that in this view the member is just moving to index position while in Fig. 4 it is in index position.

Fig. 9 is a similar view to Fig. 8 showing the index member at the completion of its movement, with the T head of the index plunger in engagement with a squared notch of the index member and is the same position as these parts are shown in Fig. 4.

Fig. 10 is an enlarged vertical side view of the frictional drive mechanism that moves and operates the indexing devices, looking in direction of the arrow "B" of Fig. 6, and shows clearly the manner of mounting and driving the several elements of the friction mechanism.

Fig. 11 shows the form with one box fully completed except the last side, and the parts for another box in position for placement in the form.

Fig. 12 shows the last side of the nearly completed box in place and the new box and its first side in position in the form, these sides are now ready for nailing. As soon as they are nailed the form is ready for turning 90 degrees. Just before it begins to turn, however, the ejector member as shown in diagram in Fig. 13, kicks the finished box off the form. This box is shown in the clear in Fig. 13, with the box form passing through its turn of 90 degrees. Fig. 14 shows it after completing this turn and Fig. 15 shows it with the bottom of the box in position for nailing. After nailing on the bottom the form is given another 90 degree turn and the box of Fig. 15 is in the same position as the partly finished box of Fig. 11, the cycle as just described is repeated continuously as long as boxes are being made.

Fig. 16 shows the indexing disk with one of the index notches blocked up. This becomes necessary when indexing a box form adapted to handle only one box at a time, where one idle side will always exist. The blocking of the notch will permit the indexing mechanism to turn the box form through 180 degrees each time, the idle side would otherwise interfere with continuous operation.

Reference now being had to the accompanying drawings in which like figures of reference indicate like parts in the various views.

The dominant idea embodied in this invention is the provision of a box assembling and nailing machine of a semiautomatic type wherein is incorporated a rotatable member adapted to hold ordinary box shooks in assembled relation while the parts are secured together by nailing, and where the depth of the boxes are shallow compared to the width, two boxes may be operated upon simultaneously.

The shook holding forms are mounted to rotate on horizontal axes and the rotation is controlled by a special designed indexing mechanism which gives positive and accurate results.

Various adjusting means are provided for properly timing and positioning the several operating mechanisms to suit the size, shape and character of the boxes being made.

The mechanism is contained within a framework comprising a base member 1, on which are mounted in opposed relation upright members 2 and 3, tied across the top by member 4, thus forming a rigid rectangular structure for containing and aligning the mechanism.

Figure 2:
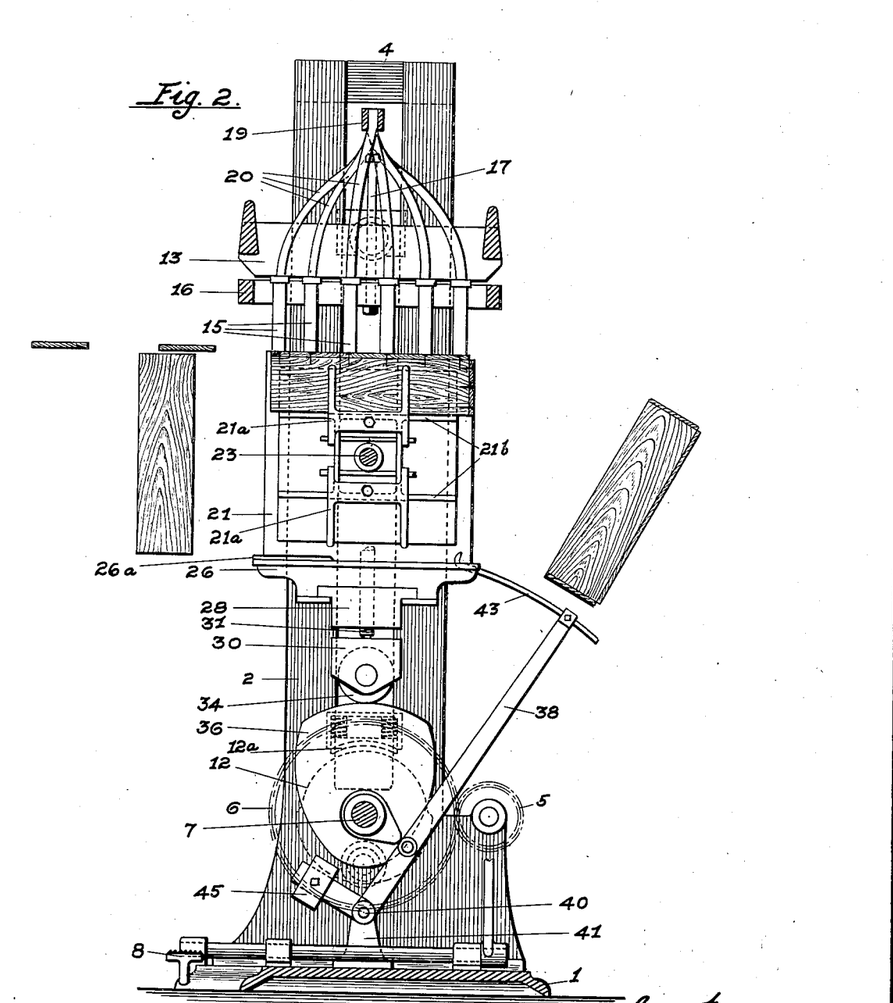

Power is applied to the machine through a pinion gear 5 shown by dotted lines on Fig. 2 and suitable clutch mechanism not shown, the pinion 5 meshing with gear 6, mounted on a horizontal drive shaft 7 extending laterally through the frame members 2 and 3 and supported in suitable bearings therein.

The clutch parts and connections leading to the foot pedal 8 have been omitted to avoid confusion and further because they are of any well known type that may be procured in any market. A part of the controlling mechanism is indicated by numeral 9, this being a throw out arm mounted on the horizontal shaft 7 which is so timed and positioned that it contacts with the clutch operating mechanism, disengaging the clutch and stopping the movements of the machine elements at a predetermined point, which will be referred to further on in the description.

On either side of the machine are located connecting rods 10 and 11. The rod 10 finding pivotal connection with the brake disk 12, and the rod 11 finding pivotal connection with the driving gear 6, clearly shown in Fig. 1. The upper ends of the rods 10 and 11 support and operate a driving frame 13, extending laterally through the top portion of the framework and being guided in its vertical movements by means of suitable bearings in the frame members 2 and 3. This driving frame 13 carries the nail punches 14, Fig. 4, which move up and down through the nailing chucks 15. The nailing chucks 15 are in turn mounted on and carried by a frame member 16, finding vertically aligned movement in the frame members 2 and 3 and normally supported by the depending, headed rods 17 and 18, the said rods in turn being supported by the member 19, which is termed a nail tube bar. Nail tubes 20 extend from the nail tube bar 19 to the nailing chucks 15. All of this nailing mechanism is regular equipment of other machines of my manufacture and need not be more specifically described in this specification.

The box forms 21 and 22 are mounted on the horizontal shaft 23, said shaft rotating in sliding bearings 24 and 25, which have vertical movement in the frame members 2 and 3.

The box forms 21 and 22 are normally supported on the nailing anvils 26 and 27, which in turn are mounted on the laterally extending, vertically movable frame members 28, the said nailing anvils being laterally adjustable on said frame member 28 to accommodate different size boxes. The frame member 28 is supported on cam follower blocks 29 and 30, by means of the adjusting screws 31 and 32. A laterally extending shaft 33 aligns and supports the cam follower blocks 29 and 30 as well as the cam rollers 34 and 35. 36 and 37 represent cams mounted on shaft 7, for imparting vertical movement to the frame member 28 and anvils 26 and 27.

Ejector members for removing the finished boxes from the forms 21 and 22 comprise rocking members 38 and 39 having pivotal support on the rock shaft 40 supported in turn in bearing members 41 and 42. The upper ends of the rocking members 38 and 39 carry ejector arms 43 and 44. The rocking members 38 and 39 are counterbalanced by means of a weight member 45. The rocking ejector members are operated and controlled in timed relation to the movements of the box forms through the medium of the cams 46 and 47 mounted on shaft 7 and contacting with cam rollers 48 and 49 secured to the ejector members 38 and 39.

Figures 3, 4:
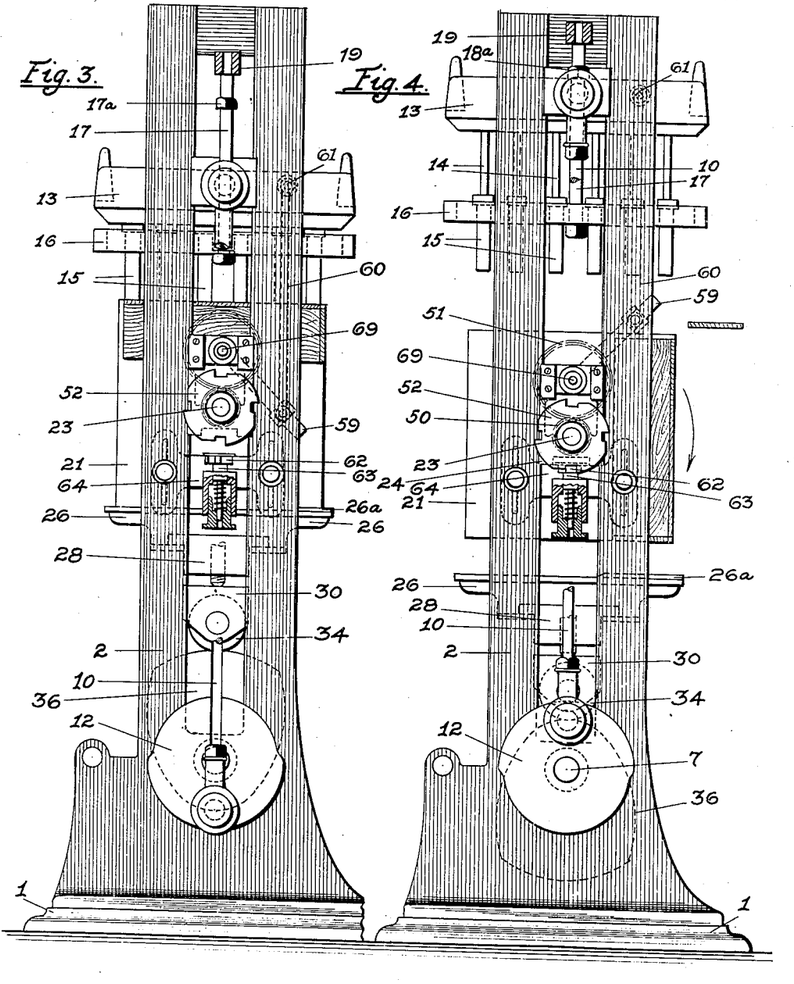
Figs. 3 and 4 are side elevations of the machine as shown in Fig. 1 looking in direction of the arrow "A.

The indexing mechanism for regulating and controlling the rotary movements of the box form are best shown in Figs. 1 and 3 to 10 inclusive. Fig. 3 is a side view of the machine looking in the direction of arrow "A" in Fig. 1 and shows the indexing mechanism in its normal inactive position, while Fig. 4 from the same angle shows the indexing mechanism in the act of indexing the position of the box form, in this view the box form having made a quarter revolution from its position in Fig. 3. The indexing mechanism comprises the following parts.

Mounted on the shaft 23 is a pinion gear 50 meshing with a frictionally controlled gear 51, the pinion 50 and the gear 51 are located on the inside of the frame member 2. On the outer end of the shaft 23 is an index member 52. The gear 51 is mounted to rotate between two friction disks 53 and 54, said disks being held into frictional contact with the gear 51 by means of the spring 55, mounted in the rotating sleeve 56. The pinion 50 and the gear 51 are held in operative mesh by the housing member 57 which is slidably contained between the upright frame members 2.

Figures 5, 6, 7, 8, 9, 10, 16:
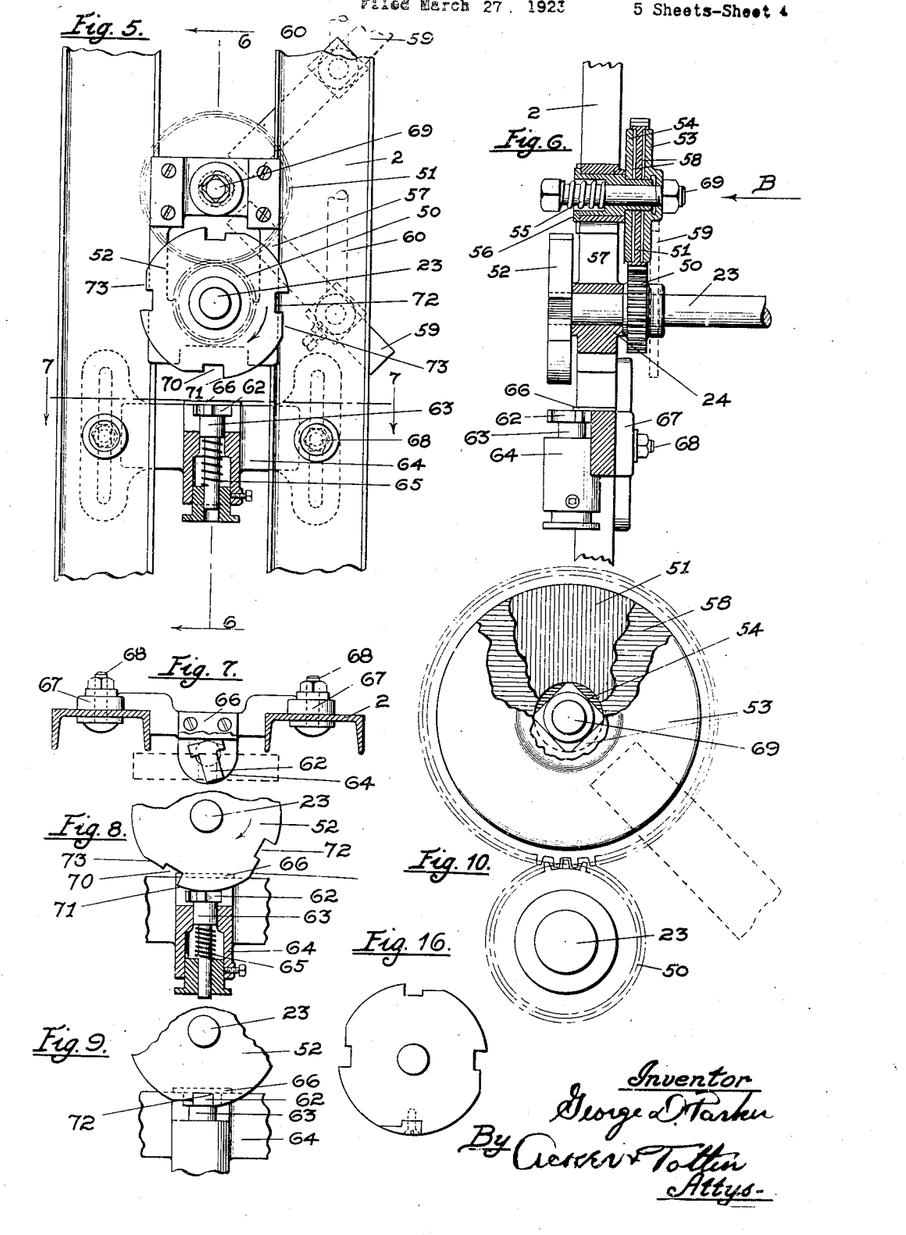

Fiber disks 58, Fig. 6, are interposed between the gear 51 and the disks 53 and 54. Secured to the outer face of the friction disk 53 is an arm 59 having pivotal connection with a connecting rod 60, which rod extends upward and pivotally connects with the frame 13 at the point 61 Fig. 1.

Located directly underneath the index disk 52 is an index block 62 made in the shape of a T, the leg of the T acting as the indexing member in conjunction with the index disk 52. This block 62 is mounted on the upper end of a plunger 63 that has vertical and rotary movement in the housing 64 and is restrained in these movements by means of the spring 65 which acts as a compression spring holding the plunger 63 and the head 62 up against a stop plate 66 with the T head set in an angular position as clearly shown in Fig. 7 and the purpose of which will be explained further on.

The housing 64 comprises extensions 67 lying back against the frame member 2 and being adjustably secured thereto by means of suitable bolts 68.

The sleeve 56 carrying the friction gear mechanism, Figs. 6 and 10, is squared on the end where the gear 51 and the friction disks 53 and 54 are mounted. This is best shown in Fig. 10. The disks 53 and 54 have square holes to fit the squared end of the sleeve 56 while the gear 51 and the fiber disks 58 are provided with round holes so as to turn freely on the squared end of the sleeve. The spring 55 being tensioned by means of the bolt 69 tends to hold the friction gear 51 and the disks 53 and 54 in sufficient resistive contact to permit of operating the indexing mechanism and the turning of the box forms when this operation is performed, the excess movement of the parts before and after the actual indexing is accomplished being absorbed by the slippage of the frictional parts just described.

Having now described the details of the mechanical construction I will further describe the operation of the machine and add what other detail description that may be desirable to make the operation clear and understandable.

We will assume that a box has been completed to the point shown in Fig. 2 referring particularly to the box on the form that needs one side to make it complete.

The continued movement of the operative elements of the machine from the positions of Fig. 2 will place them in the inactive positions of Fig. 4, the box of Fig. 2 having turned through 90 degrees during this period. When the operator has placed the box parts at the left of Fig. 2 on the form of Fig. 4, they will appear as in Fig. 12, ready for nailing. The operator now depresses pedal 8 and the following movements take place.

The shaft 7 begins to rotate and thereby moves the cams 36 and 37 from their normal inactive position as indicated in Fig. 4, through one complete revolution. During this movement of the cams 36 and 37 they raise the frame 28 and anvils 26 and 27 and they in turn engage the box forms 21 and 22 and carry them and the shaft 23 and parts connected therewith into and through the positions of Figs. 1, 2 and 3 and return them to the positions of Fig. 4. At the same instant that the shaft 7 begins to turn, the driving frame 13 and the nailing mechanism connected therewith are brought into operation, passing through the positions of Figs. 1, 2 and 3 and returning to the inactive positions of Fig. 4. These combined movements effecting the nailing of the two sides on the two separate boxes during this cycle.

It will be noted that the box forms 21 and 22 together with the shaft 23 and the indexing mechanism is brought to nailing position by resting on the anvils 26 and 27 during the period of their uppermost position. As soon therefore as the cams 36 and 37 turn far enough to permit the anvils to begin their downward movement toward the position of Figs. 4 and 13 the box forms 21 and 22 and the attending parts will also move downward through the natural pull of gravity and follow the anvils until the lower sides of the bearing blocks 24 and 25 come in contact with the upper sides of the members 64 where they will come to rest while the anvils and frame 30 will continue their downward movement until the cam rollers 34 and 35 ride over the low side of the cams 36 and 37 as they are shown clearly in Fig. 13.

Coincident with the downward movement of the anvils and box forms as just described the upward movement of the driving frame 13 begins. As soon as the shaft 7 begins to turn, the gear 6 and the brake cam 12 also begins to rotate, this immediately carries the connecting rods 10 and 11 upward and thereby lifts the frame 13. As soon as the frame 13 reaches the stop heads 17ª and 18ª on the rods 17 and 18 the continued upward movement of the frame member 13 lifts the frame 16 and nail bar 19, to their highest position as shown in Fig. 4. At the time the last described parts are being carried to their highest positions the nailing anvils and attendant parts are resting in their lowermost positions which provides ample clearance space for the free turning of the box forms as these positions are being approached.

Figure 13:
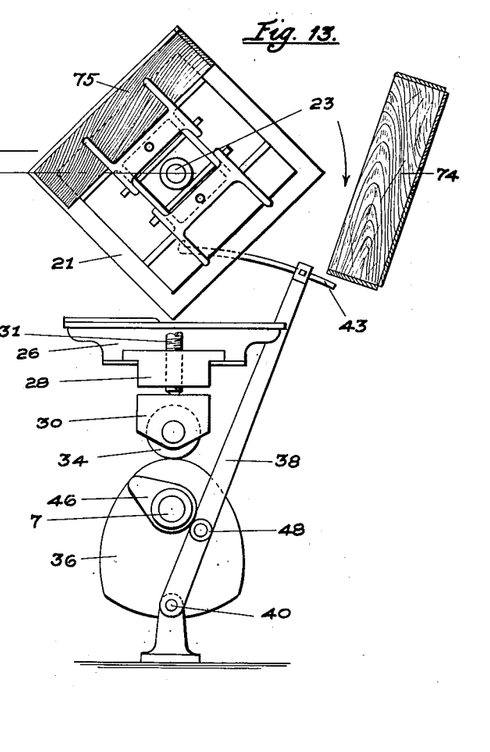

It will be noted that immediately the brake cam 12 and the gear 6 begin to rotate, the connecting rods 10 and 11 begin to raise the frame 13. This upward movement of the frame 13 immediately lifts the arm 59 through the connecting rod 60, but since the box forms 21 and 22 are still resting on the anvils 26 and 27 and following them in their downward movement, the said forms are not permitted to begin their rotation, the gear 51 therefore cannot turn, but the friction disks 53 and 54 must turn with the upward movement of the arm 59. It is therefore seen that the actual turning of the forms 21 and 22 are deferred until the anvils begin to draw their support away from the forms on account of the bearings 24 and 25 resting on the stationary supports 64. At the instant this occurs, the gear 51 begins to rotate with the friction disks 53 and 54, and, through the pinion 50 rotates the shaft 23, index disk 52 and the box forms 21 and 22, as is shown in Fig. 13. From the instant that the bearings 24 and 25 rest on the supports 64 until the end of the upward movement of the frame 13 there is sufficient movement left in the frame 13 to fully complete the 90 degree turn required of the box forms 21 and 22 to bring them into the next position for the nailing of a box side. This is possible on account of the difference in diameter of the gear 51 and the pinion 50. About a quarter turn of the gear 51 being sufficient to turn the pinion through more than 180 degree angle, and since the pivotal connection of the rod 60 to the arm 59 is adjustable the rotative movements of the gears 51 and 50 can be adjusted to suit conditions.

It is also evident that unless some positive indexing means was provided, the turning of the box forms 21 and 22 would be somewhat erratic and uncertain.

The accurate and positive indexing takes place through the action of the index disk 52 in connection with the head 62 of the plunger 63. The reason for setting the head 62 at an angle relative to a horizontal vertical plane through the machine, now becomes apparent. When the forms 21 and 22 together with the indexing mechanism comprising the disk 52, pinion 50, gear 51 and friction mechanism attendant thereto move downward with the anvils as has just been described the disk 52 and the head 62 would be placed in indexing engagement if the head 62 was permitted to enter the notch 70 of the disk 52, but by setting it at an angle as is indicated in Fig. 7 the point 71 of the disk 52 comes in contact with the top surface of the T head and depresses the plunger 63 as is indicated in Fig. 8. During the time of depressing the plunger 63 the disk 52 is not turning because the forms 21 and 22 are still resting on the anvils 26 and 27, so that the plunger is fully depressed just as the bearings 24 and 25 rest on the supports 64. At this instant of course, the forms 21 and 22, the shaft 23 and the disk 52 will begin to turn through the frictional tendency of the friction mechanism described. As soon as the disk 52 begins to rotate, its periphery slides over the top surface of the head 62 as is shown in Fig. 8. The spring 65 is adjusted to give a torsional resistance to the plunger 63 as well as a compressive resistance, so that as soon as the disk 52 begins to revolve the friction of its peripheral surface on the top surface of the head 62 may be sufficient to turn the head into indexing position, which would be a position which would permit it to enter the approaching notch 72 of the disk 52. In order however to ensure positive indexing a flat portion 73 is formed on the periphery of the disk at each advancing side of a notch 70 so that as the notch approaches the head 62, the head through the upward pressure of the spring 65 will ride up against this flat portion 73 and thus with surety enter the notch 72 as it arrives in entering alignment with the head 62. The long side of the notch 72 bearing against the head 62 and turning it into alignment with the notch. It is shown in this position in Fig. 9. Aside from an indexing mechanism the operation just described also forms a positive lock for the indexed forms 21 and 22, to hold them immovable in the indexed position while the machine is in its idle position. This locking is necessary because the movement of the driving frame 13 is a continuous reciprocation up and down during the period of one complete cycle, and since the friction mechanism that turns the forms 21 and 22 is operated from the movement of this frame 13 it is seen that the friction devices are in movement during the whole time that the frame 13 is moving, so unless the indexing of the forms was locked against displacement after once being indexed, they might through the reverse movement of the friction driving mechanism be returned to the position they were moved from and thus no change in position of the box form would have actually been accomplished. The indexing mechanism forms a locking mechanism during the period intervening until the anvils 26 and 27 returning through their cycle of movement contact with the bottom edges of the box forms and begin to raise them up into nailing position, at which instant the index disk 52 moves up and away from the head 62 and assumes the position of Fig. 5 as to location, the disk having been given a quarter turn during the operation so that notch 72 would be in the position of notch 71 of the drawing. As soon as the head 62 is released the torsional effect of the spring 65 comes into play and resets the head 62 into the position in full lines of Fig. 7, thus making it ready for the next indexing operation.

During the period of time that the parts are resting in idle position as described the operator has sufficient time to place two ends and a side in the forms 21 and 22, so that as the forms are raised up into nailing position these parts will be nailed together. With the placing of the two ends and one side of a new box he also places the last side on the partly completed box on the opposite side of the forms, so this nailing operation nails the sides on two separate boxes at the same time.

Figures 11, 12:
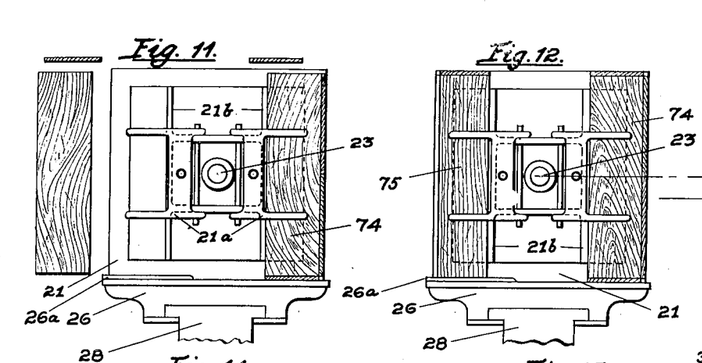
Figs. 11, 12, 13, 14 and 15 are a series of views of the same box form in its various positions during a complete cycle of operation and shows clearly how I am able to operate on more than one box at a time.
Figures 14, 15:
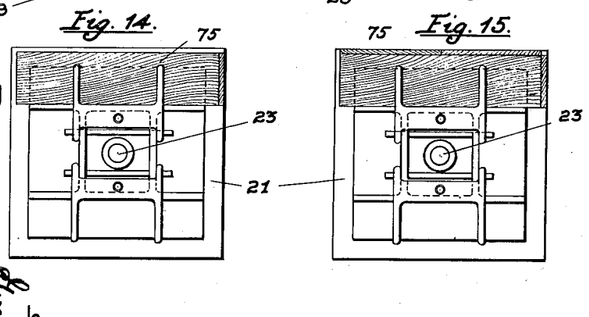

Fig. 11 clearly illustrates this operation by the attendant. As previously described, however, these views are more or less diagrammatic, so that the position of the anvils 26 and 27 would be at their lowest point of movement instead of up against the forms as shown in this view, and the nailing chucks would be elevated so the operator would have ample room to place the box parts. Looking at Fig. 11 however merely as illustrative of how the operator places the box parts it serves every purpose. Fig. 12 shows the parts in position on the forms ready for nailing. The nailing operation completes the box at the right of the view indicated by numeral 74 and at the instant that the machine is again set into motion the ejector 43 pulls the box from the form as indicated in Fig. 13. In this view the ejector has done its work and returned to its normal inactive position. In view 12 the new box is indicated by numeral 75 and in Fig. 14 the forms have completed their quarter turn and the box 75 is in position to receive its bottom. This is applied by the operator in the same manner and during the period of rest as described for the placement of the parts of Fig. 11. Fig. 15 shows the bottom parts in position for nailing, as soon as this is accomplished the form is again turned and the box is in the same position of box 74 of Fig. 11. This sequence of operations is continued as long as boxes are being made.

It will be noted that the anvils 26 and 27 are provided with spacing ridges 26ª and 27ª, these are of the same thickness as the sides of the boxes and act to space the ends relative to the forms so that the box parts will be assembled in proper positions. The box parts are held in the forms by means of the spring pressed members 21ª and 22ª which are pivoted as shown and act to hold the box parts in firm assembled relation during the nailing operations. The nailing thrust is directly taken on the ribs 21ᵇ and 22ᵇ when the bottoms are being nailed on and is absorbed by the anvils 26 and 27 when the sides are being nailed.

The box forms shown in the illustrations are the style and type adapted to operating on two boxes at the same time. When it is desired to make a box that is too deep to permit two of them on the form at the same time a different shape form is used. In fact forms of various shapes are employed to suit various box conditions, in all however the general principle is employed of having spring members to engage and hold the box parts in position and in having an abutment for taking the thrust of nailing the bottom. These various forms would all be interchangeable on the same shaft 23 of the drawings, would be supported by the driving anvils in the same manner and be indexed in the same manner and by the same mechanism. Where only one box is to be carried by the forms at a time one of the notches in the index disk 52 would be blocked as shown by Fig. 16. This becomes necessary because only three sides of the form are active sides, or in order words there is one idle side to the form and it is not desirable to have the machine stop with this side in the way of placing the new box parts when one box is completed. This can be better understood by reference to Fig. 13 with the following description. Suppose the form 21 took a box only at the side where the box 74 has just been removed, it would then be necessary to give the form a turn through 180 degrees in order to bring this side around to receive the new box parts. With a turn of only 90 degrees this side would land on the anvils and the operator would have to trip the machine a second time to bring this side in position to place the box parts. By blocking one of the notches of the indexing disk 52 as shown in Fig. 16 the box will be moved through a 90 degree turn three times and given a turn through 180 degrees each fourth time. During the turn through each of the 90 degree periods the sides and bottom are nailed and in the 180 degree turn the idle side of the form is brought uppermost so the new box parts can be placed in from the side as the box parts just entering the form of Fig. 11.

The ejector member 43 is oscillated each cycle of the machine but it ejects a box only when a box is presented in the position of the box 74 of Fig. 12. This would also be the position of ejectment of the box when only one is nailed on the form at a time, in which case the ejector would remove a box at every third stroke.

If the diameter of the forms changed from those shown in the drawings, the frame 28 carrying the driving anvils 26 and 27 would be adjusted in elevation to suit the new size by means of the adjusting screws 31 and 32, this adjustment being sufficient to accommodate quite a varied range of sizes. Of course the nailing chucks would be adjusted laterally to suit the different conditions of box size so as to get the location of the nails proper for the width of boards being used. The adjustment for height is automatic, in that the chuck carrying frame 16 with the chucks 15 always rests freely on the surface of box being nailed. The anvils 26 and 27 are also adjusted laterally on the frame 28 to suit varying box sizes.

When the machine is tripped and returns to its normal position it is desirable that it stops at some predetermined position of the various parts. This result is accomplished through the medium of the brake cam 12 on the outer end of the driving shaft 7.

Figure 1:
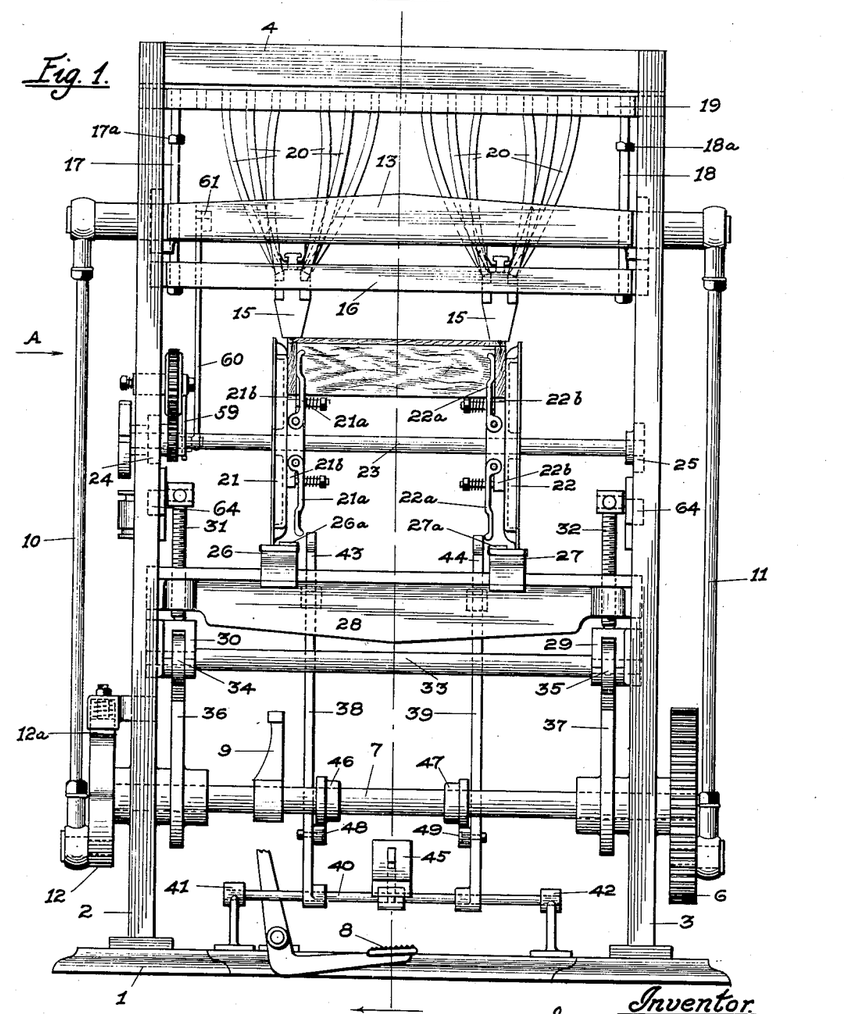

The operating parts of the machine as shown in Figs. 1, 2 and 3 are supposed to be in movement and are just about on one half of their cycle. The anvils are in their uppermost positions and the driving frame and attendant parts are in their lowermost positions and nails have just been driven in the box sides as shown. The idle or inactive position of the machine parts would be as shown in Fig. 4, with the anvils in their lowest position and the nailing mechanism in its uppermost position. In this position the brake cam 12 would be stopped with the connecting rod 10 in its highest position through the action of the brake shoe 12ª, Figs. 1 and 2 bearing on the high side of the cam 12.

I claim:

1. A machine for simultaneously manufacturing a plurality of rectangular boxes from previously cut box shooks, comprising means for holding box shooks including a plurality of opposite end members in assembled relation, means for rotating said shook holding means, indexing means for controlling the rotary movement of said shook holding means, nail driving means for uniting the assembled shooks and ejector means for removing one finished box of the plurality of boxes under construction from said holding means prior to the holding means making a complete revolution, all operated and controlled through manually operative devices.

2. A machine for simultaneously manufacturing a plurality of rectangular boxes from previously cut box shooks, comprising forms for holding box parts in assembled relation, anvil means and nail driving means operating in opposed relation, box form rotating and indexing means operable through the movement of one of said means, whereby said box forms of said plurality of boxes are simultaneously given intermittent rotation through previously determined paths, to thereby bring all sides of an assembled box into operative relation with said nailing means.

3. A machine for simultaneously manufacturing a plurality of rectangular boxes from previously cut box shooks, comprising forms for holding box parts in assembled relation and providing a support therefor, reciprocating nail driving means and reciprocating anvil means moving in opposed relation, a fixed form support, means acting as a support for the said box forms during the period of operating thereon and for transferring said forms to the fixed form support during the period of non-operation, indexing means connected with said box forms and adapted to rotate releasably lock and index the position of said forms for each cycle of said operating period.

4. A machine for simultaneously manufacturing a plurality of rectangular boxes from previously cut box parts, comprising box holding forms adapted to hold ununited box parts including a plurality of pairs of ends in assembled relation mounted for rotation on their axes and for reciprocating movement, operative means for giving said box holding forms a partial rotation and a vertical reciprocation during each cycle of operation of the movable parts of said machine, nail driving means for operating on the box parts in said forms during successive cycles until said box parts are united into a plurality of boxes, and means for ejecting one completed box before the completion of the cycle of operation in which the other box is completed.

5. A machine for forming boxes out of previously shaped box parts, comprising means for holding parts for a plurality of boxes and adapted for rotation on a horizontal axis and for reciprocation in a vertical plane, nail supplying and driving means for nailing said box parts together, indexing means for bringing the different planes of ununited box parts of the respective boxes successively within the operative zone of said nail driving means whereby they are united, manually controlled means for bringing about said conditions and automatic means for ejecting a box from said machine as the same is finished.

6. A machine for uniting previously formed box parts comprising means for holding said parts in assembled relation, said means being mounted for axial rotation and vertical reciprocation, indexing means mounted in fixed relation to said holding means and movable therewith, anvil means and nail driving means movable on opposite sides of said box parts holding means and adapted to engage said means and unite said assembled box parts while in the control of said holding means, said nail driving means and anvil means then moving away from said box parts holding means, and means for imparting rotary and reciprocative movement to said box parts holding means, whereby said holding means is positioned to present another plane to the action of said nail driving means during the next cycle of operation.

7. A machine for uniting assembled box parts comprising box parts holding means mounted for intermittent rotation on a horizontal axis and for intermittent reciprocation in a vertical plane, a reciprocating driving member for supporting said box holding means during a portion of the cycle of operation, fixed supporting means for holding said box holding means during another portion of said cycle of operation, indexing means for determining the positioning of said box holding means during each cycle of operation, all operating in timed relation and controllable through manual means.

8. A machine for uniting assembled box parts comprising a base and vertical housings for supporting and guiding box holding and box nailing means, a horizontal shaft supporting said box holding means, said shaft and box holding means being mounted for both rotary and reciprocatory motion through fixed planes within said vertical housings, said nailing means being also adapted to vertical reciprocation within said vertical housings and adapted to operate on box parts during a portion of each cycle of operation.

9. A machine for uniting assembled box parts comprising box parts holding forms mounted for both rotary and vertical displacement and adapted to occupy two different planes of location during each cycle of operation, indexing mechanism directly connected with said box forms for positioning said forms for a subsequent operation during the final stages of each cycle and friction drive means for operating said indexing mechanism.

10. A machine for uniting assembled box parts comprising box parts holding forms mounted for both rotary and vertical displacement and adapted to occupy two different planes of location during each cycle of operation, nail driving means for moving said holding forms from one plane of location to the other plane of location and returning them to the said first plane of location, and friction controlled indexing mechanism for repositioning said holding forms for a subsequent operation when said forms are returned to the said first plane of location.

11. A machine for uniting assembled box parts comprising box parts holding forms mounted on a horizontal axis and having both rotary and vertical displacement, reciprocating box nailing means operating in opposed relation on opposite sides of said box parts holding forms, the reciprocation of said nailing means effecting the vertical displacement of said box holding forms, and frictionally controlled indexing means for effecting the rotary displacement of said box forms, both of these displacements occurring in one cycle of operation, whereby the said box holding forms are positioned for a subsequent operation during the next cycle.

12. A machine for uniting assembled box parts comprising box parts holding means mounted for placement in two different planes of location during each cycle of operation, box nailing means for operating on box parts in one plane of location and indexing means for repositioning said box parts during their occupancy of the other plane of location, said indexing mechanism comprising a notched disk and a permanently located notch engaging member.

13. A machine for uniting assembled box parts comprising box parts holding forms mounted for rotation on a horizontal axis, box nailing means for operating on box parts while held by said holding forms, indexing mechanism for repositioning said box parts after each nailing operation, said indexing mechanism comprising friction drive means, a notched disk and a permanently located notch engaging indexing member operating in conjunction therewith.

14. A machine for uniting assembled box parts comprising box parts holding means mounted for both rotary and vertical displacement and adapted to occupy two different planes of location during each cycle of operation, box nailing means adapted to move said holding means from one plane of location to the other plane of location and return the same to the first plane of location, frictionally controlled indexing means for repositioning said holding means while resting in one of said planes of location, said indexing means comprising a notched indexing disk and a permanently located notch engaging member.

15. A machine for uniting assembled box parts comprising a base member and vertical housings for supporting and guiding box holding and box nailing means, said box holding means being disposed on a horizontal axis and mounted for both rotary and reciprocatory movement through fixed planes within said housings, said nailing means also being mounted for vertical movement through fixed planes within said housings and adapted to operate on box parts during said vertical movements, and frictionally operated indexing means for repositioning said box holding means after each nailing operation.

16. An indexing mechanism for box nailing machines comprising a shaft carrying box holding forms, a pinion and a notched disk, a friction drive mechanism operating in conjunction with said pinion and disk comprising a gear frictionally mounted between two friction disks and meshing with said pinion, means for imparting rotary motion to said gear whereby said pinion, shaft, box holding forms and disk are given rotary motion, and a permanently located index member for engaging said notched disk and limiting the movement thereof to accurately index the position of said box holding forms.

17. An indexing mechanism for box nailing machines comprising a shaft carrying box nailing forms, a pinion and a notched disk, a friction drive mechanism operating in conjunction with said pinion comprising a gear mounted for free rotation between two friction disks and meshing with said pinion, means for imparting motion to said gear whereby said shaft, box holding forms and notched disk are given rotary motion, a permanently located indexing member for engaging said notched disk and limiting the movement thereof to accurately index and locate the position of said box holding forms, and means for bringing said notched disk and said permanently located indexing member into operative engagement.

18. An indexing mechanism comprising forms for holding articles, a friction drive means operatively connected with said forms for imparting rotary motion thereto, a notched disk operatively connected with said forms and a permanently located indexing member adapted for engagement with said notched disk, means for imparting rotary motion to said friction drive means, and means for conveying said motion to said forms and to said notched disk while said notched disk and said permanently located indexing member are in operative contact whereby when said indexing member engages said notched disk and retards further movement thereof, said article holding forms are placed in position for subsequent operation on articles held thereby.

19. A machine for nailing assembled box parts comprising a drive shaft, cams mounted on said shaft, nailing anvils mounted to be operated by said cams, box parts holding forms mounted to be supported in nailing position by said nailing anvils, nailing means adapted to operate on box parts while said forms are being supported by said anvils and friction controlled indexing mechanism adapted to reposition said box forms for a subsequent operation when the support of said anvils is removed therefrom, with means for imparting motion to said friction controlled indexing mechanism.

20. A machine for nailing assembled box parts comprising a drive shaft, cams on said drive shaft, nailing anvils mounted to be operated by said cams, box ejector members mounted adjacent said shaft, cams on said shaft for operating said ejector members, box parts holding forms mounted for temporary support by said nailing anvils, nailing means for operating on box parts while supported by said anvils, indexing means for repositioning said forms for a subsequent operation and power means for operating said parts in timed relation.

21. A machine for nailing assembled box parts comprising a drive shaft, cams on said shaft, a supporting frame moved by said cams, nailing anvils mounted for lateral adjustment on said supporting frame, box parts holding forms mounted to rotate adjacent said anvils, nail driving means mounted for reciprocation opposite said nailing anvils, and registering mechanism for controlling the positioning of said holding forms relative to said anvils and said nail driving means.

22. A machine for nailing assembled box parts comprising nailing anvils moving through the medium of suitable cam mechanism, rotary box parts holding members mounted for moving support during a part of an operative cycle, and for fixed support during an idle period, nail driving means mounted for movement adjacent said holding forms, and automatically operated registering means for controlling the positioning of said holding forms relative to said anvils and said nail driving means.

23. Box forms for holding box parts in assembled relation, spring retained members on said forms for maintaining said box parts on said forms, repositioning means operating directly on said forms for accurately locating said forms in operative positions with means for moving said forms away from the control of said repositioning means, nailing and nail supplying means adapted to operate on box parts on said forms when said forms are in said moved away positions and means for returning said forms to the control of said repositioning means.

24. An apparatus for nailing assembled box parts adapted for making simultaneously a plurality of boxes, comprising a pair of spaced members rotatable about a horizontal axis, each of said members having means for retaining a plurality of pairs of end members for a plurality of boxes, box parts nailing devices, means for rotating said members whereby box parts are presented for nailing when said members are rotated 180 degrees and means for ejecting a completed box from said members when said members are rotated 180 degrees.

In testimony whereof I have signed my name to this specification.

GEORGE D. PARKER.